(12) United States Patent
Zhang (10) Patent No.: US 9,164,976 B2
(45) Date of Patent: Oct. 20, 2015

(54) METHOD AND SYSTEM FOR AUTOMATICALLY GENERATING VARIABLE SEQUENCE DATA, COMPUTER PROGRAM PRODUCT AND COMPUTER READABLE MEDIUM

(71) Applicants: PEKING UNIVERSITY FOUNDER GROUP CO., LTD., Beijing (CN); FOUNDER INFORMATION INDUSTRY GROUP, Beijing (CN); BEIJING FOUNDER ELECTRONICS CO., LTD., Beijing (CN)

(72) Inventor: Qiuli Zhang, Beijing (CN)

(73) Assignees: PEKING UNIVERSITY FOUNDER GROUP CO., LTD., Beijing (CN); FOUNDER INFORMATION INDUSTRY GROUP, Beijing (CN); BEIJING FOUNDER ELECTRONICS CO., LTD., Beijing (CN)

( * ) Notice: Subject to any disclaimer, the term of this patent is extended or adjusted under 35 U.S.C. 154(b) by 25 days.

(21) Appl. No.: 14/093,857

(22) Filed: Dec. 2, 2013

(65) Prior Publication Data

US 2015/0062655 A1    Mar. 5, 2015

(30) Foreign Application Priority Data

Aug. 29, 2013 (CN) .......................... 2013 1 0384982

(51) Int. Cl.
*G06F 3/12* (2006.01)
*G06F 17/24* (2006.01)

(52) U.S. Cl.
CPC .................................... *G06F 17/243* (2013.01)

(58) Field of Classification Search
None
See application file for complete search history.

(56) References Cited

U.S. PATENT DOCUMENTS

| 8,159,711 B2 * | 4/2012 | Oshima .......................... 358/1.18 |
| 8,335,984 B2 * | 12/2012 | Myoki ............................ 715/239 |
| 8,446,636 B2 * | 5/2013 | Yamazaki ....................... 358/1.9 |
| 2008/0304107 A1 * | 12/2008 | Yamakawa ................... 358/1.18 |
| 2009/0073482 A1 * | 3/2009 | Tsuchiya ...................... 358/1.14 |
| 2010/0177358 A1 * | 7/2010 | Manchala et al. ............ 358/3.28 |
| 2012/0327436 A1 * | 12/2012 | Orikasa .......................... 358/1.9 |

* cited by examiner

*Primary Examiner* — Dung Tran
(74) *Attorney, Agent, or Firm* — Hamre, Schumann, Mueller & Larson, P.C.

(57) ABSTRACT

The present application discloses a method and a system for automatically generating variable sequence data. The method comprises: acquiring a customized ary set by a user for generating variable sequence data, and characters included in the customized ary; converting the characters included in the customized ary into a character array; acquiring relevant parameters of the variable sequence data set by the user; pre-processing the relevant parameters; and generating the variable sequence data according to the character array and the pre-processed relevant parameters. According to the present invention, it is able for a user to automatically generate the desired variable sequence data.

10 Claims, 3 Drawing Sheets

| 1 | 0000000 |
| 2 | 0000013 |
| 3 | 0000027 |
| 4 | 000003A |
| 5 | 000005D |
| 6 | 0000070 |
| 7 | 0000083 |
| 8 | 0000097 |
| 9 | 00000AA |
| 10 | 00000BD |
| 11 | 00000D0 |
| 12 | 00000E3 |
| 13 | 00000F7 |
| 14 | 000010A |
| 15 | 000011D |
| 16 | 0000130 |
| 17 | 0000153 |
| 18 | 0000167 |
| 19 | 000017A |
| 20 | 000018D |

METHOD AND SYSTEM FOR AUTOMATICALLY GENERATING VARIABLE SEQUENCE DATA, COMPUTER PROGRAM PRODUCT AND COMPUTER READABLE MEDIUM

CROSS-REFERENCE TO RELATED APPLICATIONS

The present application claims priority to Chinese Patent Application No. 201310384982.4 filed before the Chinese Patent Office on Aug. 29, 2013 and entitled "METHOD AND SYSTEM FOR AUTOMATICALLY GENERATING VARIABLE SEQUENCE DATA", which is incorporated herein by reference in its entirety.

TECHNICAL FIELD

The present invention relates to the field of digital publication, and in particular to a method and a system for automatically generating variable sequence data, a computer program product and a computer readable medium.

BACKGROUND

Figure 1:
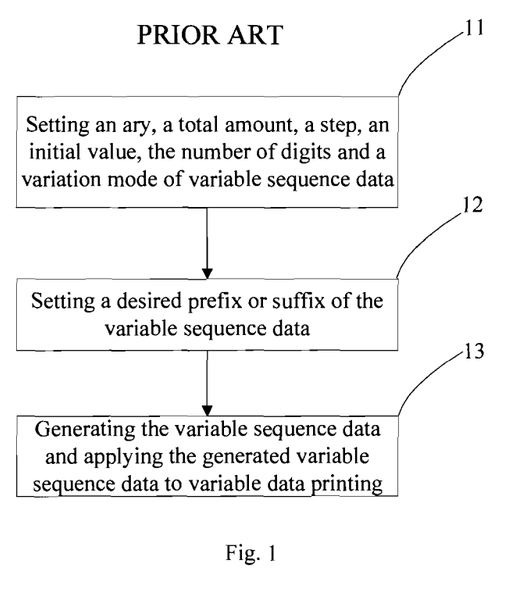
FIG. 1 is a flow chart of a method for generating variable sequence data in the prior art.

Sequence data is usually used for variable data printing (VDP), so as to identify a production status of the variable data printing. As shown in FIG. 1, variable sequence data is generated by the following steps:

Step 11: setting a desired ary, e.g., a decimal system or a hexadecimal system, for the variable sequence data, and setting a total amount, a step, an initial value, the number of digits and a variation mode of the variable sequence data to be generated;

Step 12: setting a desired prefix or suffix of the variable sequence data, e.g., a production date, a workshop code and a product identifier; and Step 13: generating the variable sequence data according to the parameters set in Steps 11 and 12, and applying the generated variable sequence data to the variable data printing.

Currently, the ary system for the variable sequence data usually includes a decimal system (0-9), a hexadecimal system (0-9 and A-F), a 26-ary system (A-Z), and a 36-ary system (0-9 and A-Z). Each of these systems includes a fixed number of characters, and cannot adapt to the users' production requirements in many cases. For example, if the user wants to exclude a certain number or letter from the generated variable sequence data, this is impossible to be achieved by an existing technology, and the user has to filter the variable sequence data after it is generated. As a result, the production efficiency will be reduced and the use of the data will be affected.

SUMMARY

An object of the present invention is to provide a method and a system for automatically generating variable sequence data, so as to enable a user to define an ary according to the actual need, and thereby to automatically generate the desired variable sequence data.

In one aspect of the present invention, a method for automatically generating variable sequence data comprises:

acquiring a customized ary set by a user for generating variable sequence data, and characters included in the customized ary;

converting the characters included in the customized ary into a character array;

acquiring relevant parameters of the variable sequence data set by the user;

pre-processing the relevant parameters; and generating the variable sequence data according to the character array and the pre-processed relevant parameters.

Preferably, the relevant parameters of the variable sequence data include an initial value, the number of digits, a total amount, a step and a variation mode of the variable sequence data.

Preferably, the step of pre-processing the relevant parameters comprises:

converting the initial value into a character array; and converting the step into an integer array and complementing the integer array according to the number of digits.

Preferably, the step of generating the variable sequence data according to the character array and the pre-processed relevant parameters comprises:

calculating from a least significant digit corresponding to the data of the initial value sequentially, and finding a digit sequence of the character corresponding to the digit in the character array; and generating the variable sequence data according to the variation mode and the digit sequence.

Preferably, the step of generating the variable sequence data according to the variation mode and the digit sequence comprises:

if the variation mode is an ascending one, adding the digit sequence to an integer corresponding to the digit in the integer array, if a resultant value is greater than or equal to a radix of the character array, taking a remainder obtained after dividing the value by the radix, finding a character corresponding to the remainder in the character array as a value of the digit for the variable sequence data, and increasing a higher order digit by 1, and if the resultant value is less than the radix of the character array, taking a character corresponding to the digit sequence of the value in the character array as a value of the digit for the variable sequence data; and if the variation mode is a descending one, subtracting the digit sequence from the integer corresponding to the digit in the integer array; if a resultant value is less than 0, taking a sum of the radix of the character array and the resultant value, finding a character corresponding to the sum in the character array as a value of the digit for the variable sequence data, and decreasing a higher order digit by 1, and if the resultant value is greater than or equal to 0, taking a character corresponding to the digit sequence of the value in the character array as a value of the digit for the variable sequence data.

In another aspect of the present invention, a system for automatically generating variable sequence data comprises:

a setting module configured to acquire a customized ary set by a user for generating variable sequence data, and characters included in the customized ary;

a converting module configured to convert the characters included in the customized ary into a character array;

a parameter acquiring module configured to acquire relevant parameters of the variable sequence data set by the user;

a pre-processing module configured to pre-process the relevant parameters; and a variable sequence data generating module configured to generate the variable sequence data according to the character array and the pre-processed relevant parameters.

Preferably, the relevant parameters of the variable sequence data include an initial value, the number of digits, a total amount, a step and a variation mode of the variable sequence data.

Preferably, the pre-processing module comprises:

a first converting unit configured to convert the initial value into a character array; and a second converting unit configured to convert the step into an integer array and complementing the integer array according to the number of digits.

Preferably, the variable sequence data generating module comprises:

a finding unit configured to calculate from a least significant digit corresponding to the data of the initial value sequentially, and find a digit sequence of the character corresponding to the digit in the character array; and a generating unit configured to generate the variable sequence data according to the variation mode and the digit sequence.

Preferably, the generating unit is specifically configured to, if the variation mode is an ascending one, add the digit sequence and an integer corresponding to the digit in the integer array, if a resultant value is greater than or equal to a radix of the character array, take a remainder obtained after dividing the value by the radix, find a character corresponding to the remainder in the character array as a value of the digit for the variable sequence data, and increase a higher order digit by 1, and if the resultant value is less than the radix of the character array, take a character corresponding to the digit sequence of the value in the character array as a value of the digit for the variable sequence data; and if the variation mode is a descending one, subtract the digit sequence from the integer corresponding to the digit in the integer array, if a resultant value is less than 0, take a sum of the radix of the character array and the resultant value, find a character corresponding to the sum in the character array as a value of the digit for the variable sequence data, and decrease a higher order digit by 1, and if the resultant value is greater than or equal to 0, take a character corresponding to the digit sequence of the value in the character array as a value of the digit for the variable sequence data.

According to the method and system for automatically generating variable sequence data of the present invention, the user can set by himself the ary and the relevant parameters for the variable sequence data, and a system can automatically generate the desired variable sequence data according to the parameters. As a result, it is able for the user to generate the desired variable sequence data in a convenient manner, and as compared with the prior art, the present invention can adapt to the requirements of different users.

DETAILED DESCRIPTION

The present invention will be described hereinafter in conjunction with the drawings and the embodiments.

Figure 2:
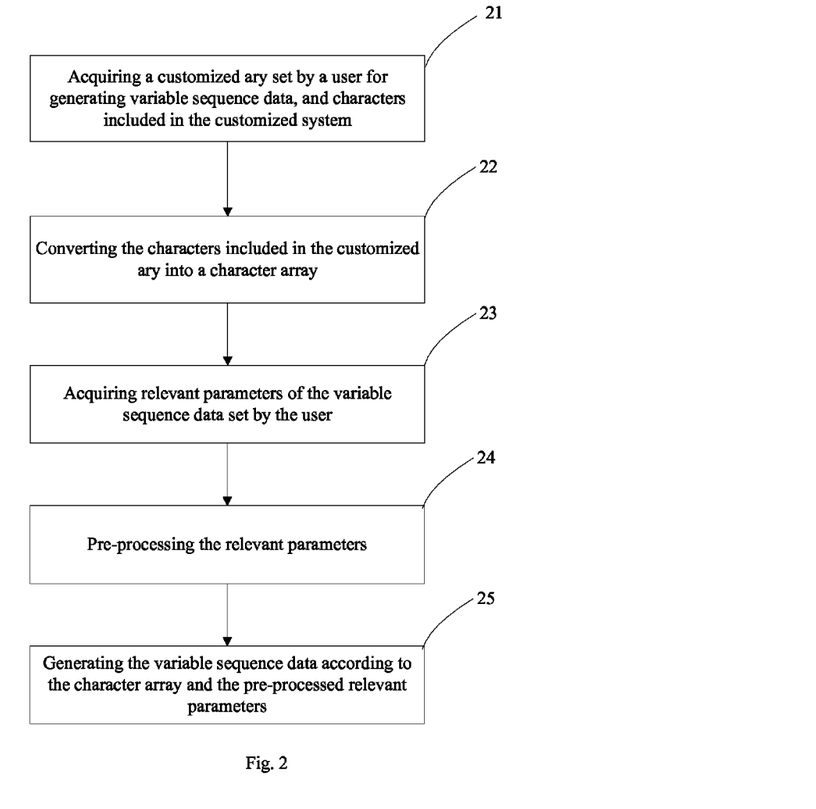
FIG. 2 is a flow chart of a method for automatically generating variable sequence data according to one embodiment of the present invention.

FIG. 2 is a flow chart of a method for automatically generating variable sequence data according to one embodiment of the present invention. As shown in FIG. 2, the method comprises the following steps.

In step 21, a customized ary set by a user for generating variable sequence data, and characters included in the customized ary is acquired.

To be specific, an option for a customized ary and an option for a character set included in the ary may be added in an editing interface for generating an optional ary for the variable sequence data. As a result, the user can set the customized ary and the characters included in the customized ary in the interface.

For example, the character set included in the customized ary may include 36 characters, i.e., 0-9 and A-Z, and the user may select the characters from these 36 characters to create the customized ary. If the user needs to add a 15-ary, the name of the 15-ary will be set as N15. If the user selects the characters 0, 1, 2, 3, 5, 6, 7, 8, 9, A, B, C, D, E, F, N15 will include these 15 characters, and a radix for the ary will be 15.

In step 22, the characters included in the customized ary are converted into a character array.

The customized ary N15 is convert into a character array CustomSystem, i.e., N15={"0", "1", "2", "3", "5", "6", "7", "8", "9", "A", "B", "C", "D", "E", "F"}.

In step 23, relevant parameters of the variable sequence data set by the user are acquired.

The relevant parameters of the variable sequence data include an initial value, an amount of digits, a total amount of data, a step length and a variation mode of the variable sequence data.

For example, the total amount of data of the variable sequence data may be set as 20, the step length may be set as 18, the amount of digits may be set as 7, and the variation mode may be set as an ascending one.

In step 24: the relevant parameters are pre-processed.

To be specific, the initial value may be converted into a character array, and the step length may be converted into an integer array and complemented with digit 0 according to the amount of digits.

For example, the user may set the variable sequence as a hexadecimal system, the amount of digits as 5, the initial data as 0000A, and the step length as 16. The step length may be converted into the hexadecimal system, i.e., 10, and then complemented with digit 0 according to the amount of digits, i.e., 00010. The complemented step length may be converted into an array {"0", "0", "0", "1", "0"}.

In step 25, the variable sequence data is generated according to the character array and the pre-processed relevant parameters.

The variable sequence data may be automatically calculated in a lookup manner, so as to generate a data file.

To be specific, calculation may be performed sequentially from a least significant digit corresponding to the data of the initial value, so as to find a digit sequence of the character corresponding to the digit in the character array.

If the variation mode is an ascending one, the digit sequence is added to an integer corresponding to the digit in the integer array. If a resultant value is greater than or equal to a radix of the character array, a remainder obtained after dividing the value by the radix is taken, a character corresponding to the remainder in the character array is found as a value of the digit for the variable sequence data, and a higher order digit is increased by 1. If the resultant value is less than the radix of the character array, a character corresponding to the digit sequence of the value in the character array is taken as a value of the digit for the variable sequence data.

If the variation mode is a descending one, the integer corresponding to the digit in the integer array is subtracted from the digit sequence. If a resultant value is less than 0, a sum of the radix of the character array and the resultant value is taken, a character corresponding to the sum in the character array is found as a value of the digit for the variable sequence data, and a higher order digit is decreased by 1. If the resultant value is greater than or equal to 0, a character corresponding to the digit sequence of the value in the character array is taken as a value of the digit for the variable sequence data.

The procedure of using the method of the present invention to automatically generate the customized variable sequence data will be described hereinafter with examples.

If the user selects the characters 0, 1, 2, 3, 5, 6, 7, 8, 9, A, B, C, D, E and F, the added customized ary N15 will include these 15 characters, and a radix of the ary will be 15.

The customized ary N15 will be convert into a character array CustomSystem as required by an algorithm, i.e., N15={"0", "1", "2", "3", "5", "6", "7", "8", "9", "A", "B", "C", "D", "E", "F"}.

The user may set the total amount of the variable sequence data as 20, set the step length as 18, set the amount of digits as 7, set the initial value as 0000000, and set the variation mode as an ascending one.

At first, the initial value may be convert into a character array StartChar[7], i.e., StartChar[7]={"0", "0", "0", "0", "0", "0", "0"}.

The step length may be converted from a decimal system, i.e., 18, into a 15-ary system, i.e., 13, and then complemented as 0000013. Hence, the step length may be convert into an integer array Step[7], i.e., Step[7]={'0', '0', '0', '0', '0', '1', '3'}.

The First Data

The first data is the initial value 0000000.

The Second Data

The least significant digit of the initial data (i.e., the first data), i.e., the rightmost digit, corresponds to the data when the subscript value of the array is the biggest, and the initial value of the array StartChar starts from 0, i.e., StartChar[0]='0', StartChar[2]='0', StartChar[3]='0', StartChar[4]='0', StartChar[5]='0' and StartChar[6]='0'.

The least significant digit of the step length data Step[7]={'0', '0', '0', '0', '0', '1', '3'}, i.e., the rightmost digit, is just the last value of the array, i.e., Step[0]='0'; Step[1]='0', Step[2]='0', Step[3]='0', Step[4]='0', Step[5]='1' and Step[6]='3'.

The step length data corresponding to the least significant digit (the rightmost digit) StartChar[6] is Step[6], the data digit sequence in N15 corresponding to StartChar[6]='0' is 0, the data digit sequence in N15 corresponding to Step[6]='3' is 3, and 0+3=3<15, so the newly generated data NewChar[6] is just the character in N15 with the digit sequence as 3, i.e., NewChar[6]=N15[3]='3'.

The data digit sequence in N15 corresponding to StartChar[5]='0' is 0, the data digit sequence in N15 corresponding to Step[5]='1' is 1, and 0+1=1<15, so the newly generated data NewChar[5] is just the character in N15 with the digit sequence as 1, i.e., NewChar[5]='1'.

The data digit sequence in N15 corresponding to StartChar[4]='0', the data digit sequence in N15 corresponding to Step[4]='0' is 0, and 0+0=0<15, so the newly generated data NewChar[4] is just the character in N15 with the digit sequence as 0, i.e., NewChar[4]='0'.

The data digit sequence in N15 corresponding to StartChar[3]='0' is 0, the data digit sequence in N15 corresponding to Step[3]='0' is 0, and 0+0=0<15, so the newly generated data NewChar[3] is just the character in N15 with the digit sequence as 0, i.e., NewChar[3]='0'.

The data digit sequence in N15 corresponding to StartChar[2]='0' is 0, the data digit sequence in N15 corresponding to Step[2]='0' is 0, and 0+0=0<15, so the newly generated data NewChar[2] is just the character in N15 with the digit sequence as 0, i.e., NewChar[2]='0'.

The data digit sequence in N15 corresponding to StartChar[1]='0' is 0, the data digit sequence in N15 corresponding to Step[1]='0' is 0, and 0+0=0<15, so the newly generated data NewChar[1] is just the character in N15 with the digit sequence as 0, i.e., NewChar[1]='0'.

The data digit sequence in N15 corresponding to StartChar[0]='0' is 0, the data digit sequence in N15 corresponding to Step[0]='0' is 0, and 0+0=0<15, so the newly generated data NewChar[0] is just the character in N15 with the digit sequence as 0, i.e., NewChar[0]='0'.

The data corresponding to NewChar[7]={'0', '0', '0', '0', '0', '1', '3'} is just 0000013.

The Third Data

The least significant digit of the second data, i.e., the rightmost digit, corresponds to the data when the subscript value of the array is the biggest, and the initial value of the array StartChar starts from 0, i.e., StartChar[0]='0', StartChar[2]='0', StartChar[3]='0', StartChar[4]='0', StartChar[5]='1' and StartChar[6]='3'.

The least significant digit of the step length data Step[7]={'0', '0', '0', '0', '0', '1', '3'}, i.e., the rightmost digit, is just the last value of the array, i.e., Step[0]='0'; Step[1]='0', Step[2]='0', Step[3]='0', Step[4]='0', Step[5]='1' and Step[6]='3'.

The step length data corresponding to the least significant digit (the rightmost digit) StartChar[6] is Step[6], the data digit sequence in N15 corresponding to StartChar[6]='3' is 3, the data digit sequence in N15 corresponding to Step[6]='3' is 3, and 3+3=6<15, so the newly generated data NewChar[6] is just the character in N15 with the digit sequence as 6, i.e., NewChar[6]=N15[6]='7'.

The data digit sequence in N15 corresponding to StartChar[5]='1' is 1, the data digit sequence in N15 corresponding to Step[5]='1' is 1, and 1+1=2<15, so the newly generated data NewChar[5] is just the character in N15 with the digit sequence as 2, i.e., NewChar[5]='2'.

The data digit sequence in N15 corresponding to StartChar[4]='0' is 0, the data digit sequence in N15 corresponding to Step[4]='0' is 0, and 0+0=0<15, so the newly generated data NewChar[4] is just the character in N15 with the digit sequence as 0, i.e., NewChar[4]='0'.

The data digit sequence in N15 corresponding to StartChar[3]='0' is 0, the data digit sequence in N15 corresponding to Step[3]='0' is 0, and 0+0=0<15, so the newly generated data NewChar[3] is just the character in N15 with the digit sequence as 0, i.e., NewChar[3]='0'.

The data digit sequence in N15 corresponding to StartChar[2]='0' is 0, the data digit sequence in N15 corresponding to Step[2]='0' is 0, and 0+0=0<15, so the newly generated data NewChar[2] is just the character in N15 with the digit sequence as 0, i.e., NewChar[2]='0'.

The data digit sequence in N15 corresponding to StartChar[1]='0' is 0, the data digit sequence in N15 corresponding to Step[1]='0' is 0, and 0+0=0<15, so the newly generated data NewChar[1] is just the character in N15 with the digit sequence as 0, i.e., NewChar[1]='0'.

The data digit sequence in N15 corresponding to StartChar[0]='0' is 0, the data digit sequence in N15 corresponding to Step[0]='0' is 0, and 0+0=0<15, so the newly generated data NewChar[0] is just the character in N15 with the digit sequence as 0, i.e., NewChar[0]='0'.

The data corresponding to NewChar[7]={'0', '0', '0', '0', '0', '2', '7' } is just 0000027.

The Fourth Data

The least significant digit (the rightmost digit) of the third data corresponds to the data when the subscript value of the array is the biggest, and the initial value of the array StartChar starts from 0, i.e., StartChar[0]='0', StartChar[2]='0', StartChar[3]='0', StartChar[4]='0', StartChar[5]='2' and StartChar[6]='7'.

The least significant digit of the step length data Step[7]={'0', '0', '0', '0', '0', '1', '3'}, i.e., the rightmost digit, is just the last value of the array, i.e., Step[0]='0'; Step[1]='0', Step[2]='0', Step[3]='0', Step[4]='0', Step[5]='1' and Step[6]='3'.

The step length data corresponding to the least significant digit (the rightmost digit) StartChar[6] is Step[6], the data digit sequence in N15 corresponding to StartChar[6]='7' is 6, the data digit sequence in N15 corresponding to Step[6]='3' is 3, and 3+6=9<15, so the newly generated data NewChar[6] is just the character in N15 with the digit sequence as 9, i.e., NewChar[6]=N15[9]='A'.

The data digit sequence in N15 corresponding to StartChar[5]='2' is 2, the data digit sequence in N15 corresponding to Step[5]='1' is 1, and 1+2=3<15, so the newly generated data NewChar[5] is just the character in N15 with the digit sequence as 3, i.e., NewChar[5]='3'.

The data digit sequence in N15 corresponding to StartChar[4]='0' is 0, the data digit sequence in N15 corresponding to Step[4]='0' is 0, and 0+0=0<15, so the newly generated data NewChar[4] is just the character in N15 with the digit sequence as 0, i.e., NewChar[4]='0'.

The data digit sequence in N15 corresponding to StartChar[3]='0' is 0, the data digit sequence in N15 corresponding to Step[3]='0' is 0, and 0+0=0<15, so the newly generated data NewChar[3] is just the character in N15 with the digit sequence as 0, i.e., NewChar[3]='0'.

The data digit sequence in N15 corresponding to StartChar[2]='0' is 0, the data digit sequence in N15 corresponding to Step[2]='0' is 0, and 0+0=0<15, so the newly generated data NewChar[2] is just the character in N15 with the digit sequence as 0, i.e., NewChar[2]='0'.

The data digit sequence in N15 corresponding to StartChar[1]='0' is 0, the data digit sequence in N15 corresponding to Step[1]='0' is 0, and 0+0=0<15, so the newly generated data NewChar[1] is just the character in N15 with the digit sequence as 0, i.e., NewChar[1]='0'.

The data digit sequence in N15 corresponding to StartChar[0]='0' is 0, the data digit sequence in N15 corresponding to Step[0]='0' is 0, and 0+0=0<15, so the newly generated data NewChar[0] is just the character in N15 with the digit sequence as 0, i.e., NewChar[0]='0'.

The data corresponding to NewChar[7]={'0', '0', '0', '0', '0', '3', 'A' } is just 000003A.

The Fifth Data

The least significant digit (the rightmost digit) of the fourth data corresponds to the data when the subscript value of the array is the biggest, and the initial value of the array StartChar starts from 0, i.e., StartChar[0]='0', StartChar[2]='0', StartChar[3]='0', StartChar[4]='0', StartChar[5]='3' and StartChar[6]='A'.

The least significant digit of the step length data Step[7]={'0', '0', '0', '0', '0', '1', '3'}, i.e., the rightmost digit, is just the last value of the array, i.e., Step[0]='0'; Step[1]='0', Step[2]='0', Step[3]='0', Step[4]='0', Step[5]='1' and Step[6]='3'.

The step length data corresponding to the least significant digit (the rightmost digit) StartChar[6] is Step[6], the data digit sequence in N15 corresponding to StartChar[6]='A' is 9, the data digit sequence in N15 corresponding to Step[6]='3' is 3, and 9+3=12<15, so the newly generated data NewChar[6] is just the character in N15 with the digit sequence as 12, i.e., NewChar[6]=N15[12]='D'.

The data digit sequence in N15 corresponding to StartChar[5]='3' is 3, the data digit sequence in N15 corresponding to Step[5]='1' is 1, and 3+1=4<15, so the newly generated data NewChar[5] is just the character in N15 with the digit sequence as 4, i.e., NewChar[5]='5'.

The data digit sequence in N15 corresponding to StartChar[4]='0' is 0, the data digit sequence in N15 corresponding to Step[4]='0' is 0, and 0+0=0<15, so the newly generated data NewChar[4] is just the character in N15 with the digit sequence as 0, i.e., NewChar[4]='0'.

The data digit sequence in N15 corresponding to StartChar[3]='0' is 0, the data digit sequence in N15 corresponding to Step[3]='0' is 0, and 0+0=0<15, so the newly generated data NewChar[3] is just the character in N15 with the digit sequence as 0, i.e., NewChar[3]='0'.

The data digit sequence in N15 corresponding to StartChar[2]='0' is 0, the data digit sequence in N15 corresponding to Step[2]='0' is 0, and 0+0=0<15, so the newly generated data NewChar[2] is just the character in N15 with the digit sequence as 0, i.e., NewChar[2]='0'.

The data digit sequence in N15 corresponding to StartChar[1]='0' is 0, the data digit sequence in N15 corresponding to Step[1]='0' is 0, and 0+0=0<15, so the newly generated data NewChar[1] is just the character in N15 with the digit sequence as 0, i.e., NewChar[1]='0'.

The data digit sequence in N15 corresponding to StartChar[O]='0' is 0, the data digit sequence in N15 corresponding to Step[0]='0' is 0, and 0+0=0<15, so the newly generated data NewChar[0] is just the character in N15 with the digit sequence as 0, i.e., NewChar[0]='0'.

The data corresponding to NewChar[7]={'0', '0', '0', '0', '0', 5', 'D' } is just 000005D.

The Sixth Data

The least significant digit (the rightmost digit) of the fifth data corresponds to the data when the subscript value of the array is the biggest, and the initial value of the array StartChar starts from 0, i.e., StartChar[O]='0', StartChar[2]='0', StartChar[3]='0', StartChar[4]='0', StartChar[5]='5' and StartChar[6]='D'.

The least significant digit of the step length data Step[7]={'0', '0', '0', '0', '0', '1', '3' }, i.e., the rightmost digit, is just the last value of the array, i.e., Step[0]='0'; Step[1]='0', Step[2]='0', Step[3]='0', Step[4]='0', Step[5]='1' and Step[6]='3'.

The step length data corresponding to the least significant digit (the rightmost digit) StartChar[6] is Step[6], the data digit sequence in N15 corresponding to StartChar[6]='D' is 12, the data digit sequence in N15 corresponding to Step[6]='3' is 3, 12+3=15>=15 and 15%15=0, so the newly generated data NewChar[6] is just the character in N15 with the digit sequence as 0, i.e., NewChar[6]=N15[1]='0', and the digit is increased by 1.

The data digit sequence in N15 corresponding to StartChar[5]='5' is 4, the data digit sequence in N15 corresponding to Step[5]='1' is 1, 4+1=5 and 5+1=6<15, so the newly generated data NewChar[5] is just the character in N15 with the digit sequence as 6, i.e., NewChar[5]='7'.

The data digit sequence in N15 corresponding to StartChar[4]='0' is 0, the data digit sequence in N15 corresponding to Step[4]='0' is 0, and 0+0=0<15, so the newly generated data NewChar[4] is just the character in N15 with the digit sequence as 0, i.e., NewChar[4]='0'.

The data digit sequence in N15 corresponding to StartChar[3]='0' is 0, the data digit sequence in N15 corresponding to Step[3]='0' is 0, and 0+0=0<15, so the newly generated data NewChar[3] is just the character in N15 with the digit sequence as 0, i.e., NewChar[3]='0'.

The data digit sequence in N15 corresponding to StartChar[2]='0' is 0, the data digit sequence in N15 corresponding to Step[2]='0' is 0, and 0+0=0<15, so the newly generated data NewChar[2] is just the character in N15 with the digit sequence as 0, i.e., NewChar[2]='0'.

The data digit sequence in N15 corresponding to StartChar[1]='0' is 0, the data digit sequence in N15 corresponding to Step[1]='0' is 0, and 0+0=0<15, so the newly generated data NewChar[1] is just the character in N15 with the digit sequence as 0, i.e., NewChar[1]='0'.

The data digit sequence in N15 corresponding to StartChar[0]='0' is 0, the data digit sequence in N15 corresponding to Step[0]='0' is 0, and 0+0=0<15, so the newly generated data NewChar[0] is just the character in N15 with the digit sequence as 0, i.e., NewChar[0]='0'.

The data corresponding to NewChar[7]={'0', '0', '0', '0', '0', '7', '0' } is just 0000070.

Figure 3:
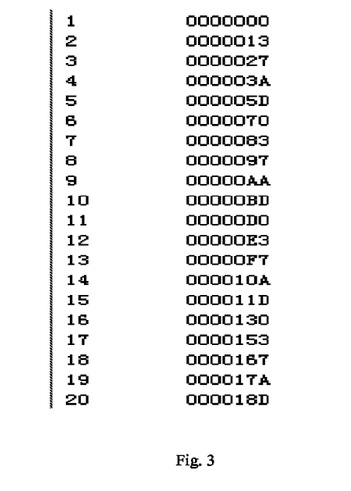
FIG. 3 is a schematic view showing the generated variable sequence data with a customized ary according to one embodiment of the present invention.

By analogy, the final 20 pieces of data are generated as shown in FIG. 3.

As mentioned above, according to the method of the present invention, it is able to automatically generate the desired variable sequence data according to the ary and the relevant parameters set by the user. By using the method of the present invention, the user can generate the desired variable sequence data in a convenient manner, and as compared with the prior art, the method of the present invention can adapt to the requirements of different users.

Figure 4:
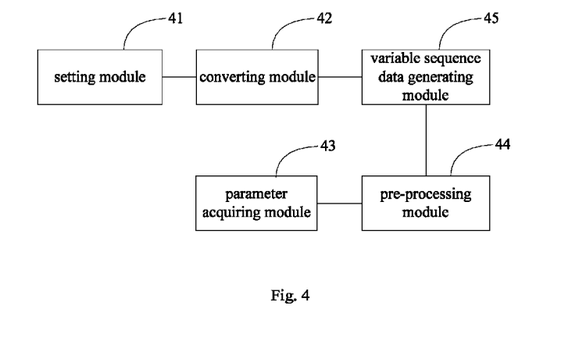
FIG. 4 is a schematic view showing a system for automatically generating variable sequence data according to one embodiment of the present invention.

Correspondingly, the present invention further provides a system for automatically generating variable sequence data, as shown in FIG. 4. The system comprises:

a setting module 41 configured to acquire a customized ary set by a user for generating variable sequence data, and characters included in the customized ary;

a converting module 42 configured to convert the characters included in the customized ary into a character array;

a parameter acquiring module 43 configured to acquire relevant parameters of the variable sequence data set by the user;

a pre-processing module 44 configured to pre-process the relevant parameters; and a variable sequence data generating module 45 configured to generate the variable sequence data according to the character array and the pre-processed relevant parameters.

The relevant parameters of the variable sequence data include an initial value, an amount of digits, a total amount of data, a step length and a variation mode of the variable sequence data.

The pre-processing module 44 comprises a first converting unit configured to convert the initial value into a character array, and a second converting unit configured to convert the step length into an integer array and complement the integer array with digit 0 according to the amount of digits.

The variable sequence data generating module 45 comprises a finding unit configured to calculate from a least significant digit corresponding to the data of the initial value sequentially, and find a digit sequence of the character corresponding to the digit in the character array, and a generating unit configured to generate the variable sequence data according to the variation mode and the digit sequence.

The generating unit is specifically configured to, if the variation mode is an ascending one, add the digit sequence and an integer corresponding to the digit in the integer array, if a resultant value is greater than or equal to a radix of the character array, take a remainder obtained after dividing the value by the radix, find a character corresponding to the remainder in the character array as a value of the digit for the variable sequence data, and increase a high order digit by 1, and if the resultant value is less than the radix of the character array, take a character corresponding to the digit sequence of the value in the character array as a value of the digit for the variable sequence data; and if the variation mode is a descending one, subtract the integer corresponding to the digit in the integer array from the digit sequence, if a resultant value is less than 0, take a sum of the radix of the character array and the resultant value, find a character corresponding to the sum in the character array as a value of the digit for the variable sequence data, and decrease a high order digit by 1, and if the resultant value is greater than or equal to 0, take a character corresponding to the digit sequence of the value in the character array as a value of the digit for the variable sequence data. The specific procedure may refer to that mentioned in the method, and it will not be repeated herein.

According to the system for automatically generating variable sequence data of the present invention, the user can set by himself the ary and the relevant parameters for the variable sequence data, and a system can automatically generate the desired variable sequence data according to the parameters. As a result, it is able for the user to generate the desired variable sequence data in a convenient manner, and as compared with the prior art, the present invention can adapt to the requirements of different users.

Obviously, it should be appreciated that, the modules or steps of the present invention may be implemented via general calculation means, e.g., a single calculation means or a network consisting of several calculation means. Alternatively, they may be implemented via program codes that can be executed by the calculation means. Hence, the modules or steps may be stored in a storage means and executed by the calculation means, or may be implemented by manufacturing them into several IC modules respectively or by manufacturing some of them into a signal IC module. As a result, the present invention is not limited to any specific combination of hardware and software.

The above are merely the preferred embodiments of the present invention, and these embodiments shall not be construed as limiting the present invention. It should be noted that, a person skilled in the art may further make improvements and modifications without departing from the principle of the present invention, and these improvements and modifications shall also be considered as the scope of the present invention.

What is claimed is:

1. A computer-implemented method for automatically generating variable sequence data, comprising the steps of:
    acquiring a customized ary set by a user for generating variable sequence data, and characters included in the customized ary;
    converting, by a processor, the characters included in the customized ary into a character array in which the characters included in the customized ary are arranged in sequence to represent values in the customized ary;
    acquiring parameters set by the user for generating the variable sequence data;
    pre-processing, by the processor, the parameters; and
    generating, by the processor, the variable sequence data according to the character array converted from the characters included in the customized ary and the pre-processed parameters;

wherein the parameters comprise an initial value, an amount of digits, a total amount of data, a step length, and a variation mode of the variable sequence data, wherein the pre-processing, by the processor, the parameters comprises:
converting the initial value into a customized ary data in form of a character array; and
converting the step length into a customized ary data in form of an integer array and complementing the integer array according to the amount of digits;

wherein the variation mode is ascending or descending;

wherein the generating, by the processor, the variable sequence data according to the character array converted from the characters included in the customized ary and the parameters having been pre-processed comprises:
when the variation mode is ascending, sequentially adding the customized ary data converted from the step length to the customized ary data converted from the initial value to obtain a plurality of variable sequence data until an amount of the variable sequence data reaches the total amount of data;
when the variation mode is descending, sequentially subtracting the customized ary data converted from the step length from the customized ary data converted from the initial value to obtain a plurality of variable sequence data until an amount of the variable sequence data reaches the total amount of data.

2. The computer-implemented method according to claim 1, wherein when the variation mode is ascending, the sequentially adding the customized ary data converted from the step length to the customized ary data converted from the initial value to obtain a plurality of variable sequence data until the amount of the variable sequence data reaches the total amount of data comprises:
obtaining an N-th one of the variable sequence data in such a manner that when N is equal to 1, the N-th one of the variable sequence data is the customized ary data converted from the initial value;
when N is greater than or equal to 2,
calculating from a least significant digit of an (N−1)-th one of the variable sequence data;
finding a digit sequence of a character of the (N−1)-th data corresponding to a digit in current calculation in the character array converted from the characters included in the customized ary; and
adding an integer of the customized ary data converted from the step length corresponding to the digit in current calculation, to the digit sequence found in the character array converted from the characters included in the customized ary;
if a resultant value is greater than or equal to a radix of the character array converted from the characters included in the customized ary, taking a remainder obtained after dividing the resultant value by the radix, finding a character according to a digit sequence represented by the remainder in the character array converted from the characters included in the customized ary as a value of the digit in current calculation for the N-th one of the variable sequence data, and increasing a higher order digit by 1, and if the resultant value is less than the radix of the character array converted from the characters included in the customized ary, finding a character according to a digit sequence represented by the resultant value in the character array converted from the characters included in the customized ary as a value of the digit in the current calculation for the N-th one of the variable sequence data.

3. The computer-implemented method according to claim 1, wherein when the variation mode is descending, the sequentially subtracting the customized ary data converted from the step length from the customized ary data converted from the initial value to obtain the plurality of variable sequence data until the amount of the variable sequence data reaches the total amount of data comprises:
obtaining an N-th one of the variable sequence data in such a manner that when N is equal to 1, the N-th one of the variable sequence data is the customized ary data converted from the initial value;
when N is greater than or equal to 2,
calculating from a least significant digit of an (N−1)-th one of the variable sequence data;
finding a digit sequence of a character of the (N−1)-th data corresponding to a digit in current calculation in the character array converted from the characters included in the customized ary; and
subtracting an integer of the customized ary data converted from the step length corresponding to the digit in current calculation from the digit sequence found in the character array converted from the characters included in the customized ary;
if a resultant value is less than 0, taking a sum of the radix of the character array converted from the characters included in the customized ary and the resultant value, finding a character according to a digit sequence represented by the sum in the character array converted from the characters included in the customized ary as a value of the digit in current calculation for the N-th one of the variable sequence data, and decreasing a higher order digit by 1, and
if the resultant value is greater than or equal to 0, finding a character according to a digit sequence represented by the resultant value in the character array converted from the characters included in the customized ary as a value of the digit in current calculation for the N-th one of the variable sequence data.

4. The computer-implemented method according to claim 1, wherein the characters included in the customized ary comprise inconsecutive numbers and/or inconsecutive letters.

5. A system for automatically generating variable sequence data, comprising:
a setting module that acquires a customized ary set by a user for generating variable sequence data, and characters included in the customized ary;
a converting module that converts the characters included in the customized ary into a character array in which the characters included in the customized ary are arranged in sequence to represent values in the customized ary;
a parameter acquiring module that acquires parameters set by the user for generating the variable sequence data;
a pre-processing circuit that pre-processes the parameters; and
a variable sequence data generating circuit that generates the variable sequence data according to the character array converted from the characters included in the customized ary and the pre-processed parameters;
wherein the parameters comprises an initial value, an amount of digits, a total amount of data, a step length and a variation mode of the variable sequence data;
wherein the pre-processing circuit is further configured to,
convert the initial value into a customized ary data in form of a character array;

convert the step length into a customized ary data in form of an integer array and complement the integer array according to the amount of digits;

wherein the variation mode is ascending or descending;

wherein the variable sequence data generating circuit is further configured to, when the variation mode is ascending, sequentially add the customized ary data converted from the step length to the customized ary data converted from the initial value to obtain a plurality of variable sequence data until an amount of the variable sequence data reaches the total amount of data;

when the variation mode is descending, sequentially subtract the customized ary data converted from the step length from the customized ary data converted from the initial value to obtain a plurality of variable sequence data until an amount of the variable sequence data reaches the total amount of data.

6. The system according to claim 5, wherein the variable sequence data generating module is specifically configured to, when the variation mode is ascending, obtain an N-th one of the variable sequence data in such a manner that when N is equal to 1, the N-th one of the variable sequence data is the customized ary data converted from the initial value;

when N is greater than or equal to 2, calculate from a least significant digit of an (N−1)-th one of the variable sequence data;

find a digit sequence of a character of the (N−1)-th data corresponding to a digit in current calculation in the character array converted from the characters included in the customized ary; and add an integer of the customized ary data converted from the step length corresponding to the digit in current calculation, to the digit sequence found in the character array converted from the characters included in the customized ary;

if a resultant value is greater than or equal to a radix of the character array converted from the characters included in the customized ary, take a remainder obtained after dividing the resultant value by the radix, find a character according to a digit sequence represented by the remainder in the character array converted from the characters included in the customized ary as a value of the digit in current calculation for the N-th one of the variable sequence data, and increase a higher order digit by 1, and if the resultant value is less than the radix of the character array converted from the characters included in the customized ary, find a character according to a digit sequence represented by the resultant value in the character array converted from the characters included in the customized ary as a value of the digit in current calculation for the N-th one of the variable sequence data;

when the variation mode is descending, obtain an N-th one of the variable sequence data in such a manner that when N is equal to 1, the N-th one of the variable sequence data is the customized ary data converted from the initial value;

when N is greater than or equal to 2, calculate from a least significant digit of an (N−1)-th one of the variable sequence data;

find a digit sequence of a character of the (N−1)-th data corresponding to a digit in current calculation in the character array converted from the characters included in the customized ary; and subtract an integer of the customized ary data converted from the step length corresponding to the digit in current calculation from the digit sequence found in the character array converted from the characters included in the customized ary;

if a resultant value is less than 0, take a sum of the radix of the character array converted from the characters included in the customized ary and the resultant value, find a character according to a digit sequence represented by the sum in the character array converted from the characters included in the customized ary as a value of the digit in current calculation for the N-th one of the variable sequence data, and decrease a higher order digit by 1, and if the resultant value is greater than or equal to 0, find a character according to a digit sequence represented by the resultant value in the character array converted from the characters included in the customized ary as a value of the digit in current calculation for the N-th one of the variable sequence data.

7. A computer program embodied on a non-transitory computer readable medium, comprising computer code for implementing the method according to claim 1.

8. A computer-implemented method for automatically generating variable sequence data, comprising the steps of:

setting by a user through an editing interface, a customized ary for generating variable sequence data;

selecting by the user through the editing interface, characters from numbers 0-9 and letters A-Z in such a manner that an amount of the selected characters is equal to a radix of the customized ary and the selected characters comprises inconsecutive numbers and/or inconsecutive letters;

arranging the selected characters to form a character array in which the selected characters are arranged in sequence to represent values in the customized ary;

setting by the user through the editing interface, parameters comprising an initial value, an amount of digits, a total amount of data, a step length and a variation mode for the variable sequence data;

converting, by a processor, the initial value into a first customized ary data, and converting the step length into a second customized ary data in form of an integer array and complementing the integer array according to the amount of digits;

when the variation mode is ascending, successively adding, by the processor, the second customized ary data to the first customized ary data to obtain a plurality of variable sequence data by looking up the character array until an amount of the variable sequence data reaches the total amount of data;

when the variation mode is descending, successively subtracting, by the processor, the second customized ary data from the first customized ary data to obtain a plurality of variable sequence data by looking up the character array until an amount of the variable sequence data reaches the total amount of data.

9. The computer-implemented method according to claim 8, wherein when the variation mode is the ascending, successively adding, by the processor, the second customized ary data to the first customized ary data to obtain the plurality of variable sequence data by looking up the character array until the amount of the variable sequence data reaches the total amount of data comprises:

obtaining an N-th one of the variable sequence data in such a manner that when N is equal to 1, the N-th one of the variable sequence data is the first customized ary data;

when N is greater than or equal to 2, calculating from a least significant digit of an (N−1)-th one of the variable sequence data;

finding a digit sequence of a character of the (N−1)-th data corresponding to a digit in current calculation in the character array; and adding an integer of the second customized ary data corresponding to the digit in current calculation, to the digit sequence found in the character array;

if a resultant value is greater than or equal to the radix, taking a remainder obtained after dividing the resultant value by the radix, finding a character according to a digit sequence represented by the remainder in the character array as a value of the digit in current calculation for the N-th one of the variable sequence data, and increasing a higher order digit by 1; and if the resultant value is less than the radix, finding a character according to a digit sequence represented by the resultant value in the character array as a value of the digit in current calculation for the N-th one of the variable sequence data.

10. The computer-implemented method according to claim 8, wherein when the variation mode is descending, successively subtracting, by the processor, the second customized ary data from the first customized ary data to obtain the plurality of variable sequence data by looking up the character array until the amount of the variable sequence data reaches the total amount of data comprises:

obtaining an N-th one of the variable sequence data in such a manner that when N is equal to 1, the N-th one of the variable sequence data is the first customized ary data;

when N is greater than or equal to 2, calculating from a least significant digit of an (N−1)-th one of the variable sequence data;

finding a digit sequence of a character of the (N−1)-th data corresponding to a digit in current calculation in the character array; and subtracting an integer of the second customized ary data corresponding to the digit in current calculation from the digit sequence found in the character array;

if a resultant value is less than 0, taking a sum of the radix and the resultant value, finding a character according to a digit sequence represented by the sum in the character array as a value of the digit in current calculation for the N-th one of the variable sequence data, and decreasing a higher order digit by 1; and if the resultant value is greater than or equal to 0, finding a character according to a digit sequence represented by the resultant value in the character array as a value of the digit in current calculation for the N-th one of the variable sequence data.

\* \* \* \* \*